United States Patent
Fosse et al.

(10) Patent No.: US 6,505,857 B2
(45) Date of Patent: Jan. 14, 2003

(54) ARRANGEMENT FOR A STEERING SYSTEM FOR A VEHICLE AND METHOD FOR MOUNTING A STEERING SYSTEM

(75) Inventors: Tore Fosse, Göteborg (SE); Arash Houshmand, Västra Frölunda (SE)

(73) Assignee: Volvo Personvagnar AB (SE)

( * ) Notice: Subject to any disclaimer, the term of this patent is extended or adjusted under 35 U.S.C. 154(b) by 0 days.

(21) Appl. No.: 09/728,178

(22) Filed: Dec. 1, 2000

(65) Prior Publication Data

US 2001/0020782 A1 Sep. 13, 2001

Related U.S. Application Data

(63) Continuation of application No. PCT/SE99/00931, filed on Jun. 1, 1999.

(30) Foreign Application Priority Data

Jun. 3, 1998 (SE) .............................................. 9801960

(51) Int. Cl.[7] .............................................. B62D 1/99
(52) U.S. Cl. ...................................... 280/779; 74/492
(58) Field of Search .................. 74/492, 493; 280/775, 280/779; 403/334, 354, 361; 464/140, 162

(56) References Cited

U.S. PATENT DOCUMENTS

| | | | | |
|---|---|---|---|---|
| 4,907,564 A | * | 3/1990 | Sowa et al. .................... 125/21 |
| 5,152,718 A | * | 10/1992 | Confer ......................... 464/93 |
| 5,226,853 A | * | 7/1993 | Courgeon ................... 464/160 |
| 5,243,874 A | * | 9/1993 | Wolfe et al. ................... 74/493 |
| 5,582,489 A | * | 12/1996 | Marzio et al. ............... 403/354 |
| 5,711,189 A | * | 1/1998 | Cartwright et al. ............ 74/493 |
| 5,732,600 A | * | 3/1998 | Peterson et al. .............. 74/492 |
| 6,032,981 A | * | 3/2000 | Imanishi et al. ............. 280/777 |
| 6,164,698 A | * | 12/2000 | Gotoh ......................... 280/771 |
| 6,267,528 B1 | * | 7/2001 | Higashino ................. 403/359.5 |

FOREIGN PATENT DOCUMENTS

GB 2124739 A 2/1984

* cited by examiner

Primary Examiner—Kevin Hurley
Assistant Examiner—L. Lum
(74) Attorney, Agent, or Firm—Howrey, Simon, Arnold & White LLP

(57) ABSTRACT

Arrangement for a steering system (1) for a vehicle having a steering wheel (2) and a main shaft (3, 8, 10) which is connected to the steering wheel (2) and also suspended in the vehicle. The main shaft (3, 8, 10) is also connected to a steering gear which belongs to the steering system (1) and comprises an input shaft (12) for transmission of a rotary movement of the main shaft (3, 8, 10) to said steering gear. An end portion of said main shaft (3, 8, 10) facing the input shaft (12) is terminated by a first deformation (13) adapted for locking interaction with a second deformation (14) in the input shaft (12), by means of which said rotary movement is transmitted to the steering gear. A method is also disclosed for mounting a steering system (1) in a vehicle. By means of the invention, an improved mounting of a steering system (1) in a vehicle is provided, in particular a simple mounting and a secure connection between a main shaft and a pinion of a steering gear.

11 Claims, 2 Drawing Sheets

ARRANGEMENT FOR A STEERING SYSTEM FOR A VEHICLE AND METHOD FOR MOUNTING A STEERING SYSTEM

RELATED PATENT APPLICATIONS

This is a continuation patent application of International Application Number PCT/SE99/00931 filed Jun. 1, 1999 entitled STEERING ARRANGEMENT FOR VEHICLES AND METHOD FOR ASSEMBLY OF A STEERING ARRANGEMENT and which designates the United States.

TECHNICAL FIELD

The present invention relates to an arrangement for a steering system for a vehicle. More particularly, the invention relates to a method and arrangement that permits efficient mounting of a steering system in a passenger car.

BACKGROUND OF THE INVENTION

In a motor vehicle, exemplarily a passenger car, a steering system is typically utilized to steer the front wheels of the vehicle. Such a steering system normally includes a steering wheel and an upper main shaft on which the steering wheel is arranged. The upper main shaft is suitably mounted so that it extends through a specially designed steering column which is in turn suspended in the body of the vehicle, specifically on the underside of the dashboard.

The steering column can be designed so that it absorbs energy in the event that the steering wheel and the upper main shaft are acted on by great force in the direction towards the front of the vehicle; a situation which can occur if the vehicle is involved in a crash. This can happen in such a situation if the driver of the vehicle is thrown forwards with great force; a force that can be transmitted to the steering wheel and the upper main shaft. By adapting the steering column so that it absorbs energy, the upper main shaft is allowed to move a certain distance in relation to the steering column to absorb energy. This, in turn, reduces the stresses experienced by the driver in the course of a collision.

Furthermore, the upper main shaft extends through a guide passage in the intermediate panel of the vehicle and is connected to a lower main shaft via a joint. The lower main shaft is in turn connected to a steering gear arranged in the vehicle via a further, lower joint. In this way, the movements of the steering wheel can be transmitted via the upper and the lower main shaft, and on to the steering gear. In modern vehicles, the steering gear is usually of the rack-type variety which comprises an input shaft in the form of a pinion with a gear drive which is connected to a rack. The movements of the steering wheel cause a rotary movement of the pinion that acts on the rack which, in turn, acts on separate steering connecting rods. It is in this way that the steering wheels of the vehicle are turned.

When a steering system is mounted in a passenger car, the upper main shaft is first arranged in position in the above-mentioned steering column. The steering column is then mounted on the underside of the dashboard of the vehicle. In this situation, it is a prerequisite that the lower main shaft be mounted beforehand on the upper main shaft via a joint. This results in the lower main shaft, after the steering column has been mounted, hanging down from this joint. The mounting procedure is then completed by the lower main shaft being mounted firmly on the steering gear, which is carried out by a fitter-technician who stretches under the dashboard, takes hold of the lower main shaft, and connects it together with the lower joint, which in turn is connected to the steering gear. This is an awkward operation for the technician because the working area is not easily accessible. Usually, the technician cannot see where the lower main shaft is located, and therefore has to feel his/her way forward under the dashboard in order to take hold of the lower main shaft and mount it firmly in the correct manner. A further disadvantage of known mounting procedures as described hereinabove, is that it is relatively time-consuming.

In view of the above described deficiencies associated with conventionally designed steering arrangements and installation procedures therefore, the present invention has been developed. These enhancements and benefits are described in greater detail hereinbelow with respect to several alternative embodiments of the present invention.

SUMMARY OF THE INVENTION

The present invention in its several disclosed embodiments alleviates the drawbacks and deficiencies described above with respect to conventionally designed steering arrangements and their methods of installation; the invention further incorporates several additional beneficial features which will become evident to those skilled in the art from the following description.

In one aspect, the present invention provides an improved arrangement for a is steering system for a vehicle, in which the above-mentioned problems are solved and which provides simple mounting and a safe interconnection between a main shaft and a steering gear.

Further, the invention provides a method for automatic mounting of a steering system in a motor vehicle; in particular, it enables simple and cost-effective mounting of the steering system in the vehicle.

An arrangement, according to the invention, may take the form of a steering system for a vehicle that includes a steering wheel and a main shaft which is connected to the steering wheel and also suspended in the vehicle. The main shaft is connected to a steering gear which belongs to the steering system and which has an input shaft for transmission of rotary movement of the main shaft to the steering gear. The arrangement is configured so that that end portion of the main shaft facing the input shaft terminates in a first deformation adapted for locking interaction with a second deformation in the input shaft; this locking interaction being accomplished when rotary movement is transmitted to the steering gear.

A number of advantages are achieved by virtue of the fact that the main shaft can be mounted on the input shaft by way of the above-mentioned deformations. For example, a good ergonomic situation is afforded for the fitting technician who is charged with mounting the steering system into the vehicle; exemplarily, in a case where the invention is used in connection with manual mounting. The invention also affords rapid and simple mounting of a steering system, which is inexpensive in process terms. Moreover, the invention is cost-effective in production terms because the above-mentioned deformations can be produced easily by, for example, casting and milling.

A major advantage of the invention is that it can be used in connection with an automated production process for motor vehicles. In such an assembly process, a robot can be programmed to take hold of a lower main shaft and guide it into position on the pinion. A locking sleeve can then be automatically screwed tightly thereon by the robot so that the connection is secured.

The beneficial effects described above apply generally to the exemplary devices, mechanisms and methods/processes disclosed herein for the mounting of a steering system in a transporting vehicle. The specific structures and steps through which these benefits are delivered will be described in greater detail hereinbelow.

BRIEF DESCRIPTION OF THE DRAWINGS

The invention will now be described in greater detail in the following way, by example only, and with reference to the attached drawings, in which.

DETAILED DESCRIPTION OF THE INVENTION

As required, detailed embodiments of the present invention are disclosed herein. However, it is to be understood that the disclosed embodiments are merely exemplary of the invention that may be embodied in various and alternative forms. The figures are not necessarily to scale, some features may be exaggerated or minimized to show details of particular components or processes. Therefore, specific structural and functional details disclosed herein are not to be interpreted as limiting, but merely as a basis for the claims and as a representative basis for teaching one skilled in the art to variously employ the present invention.

Figure 1:
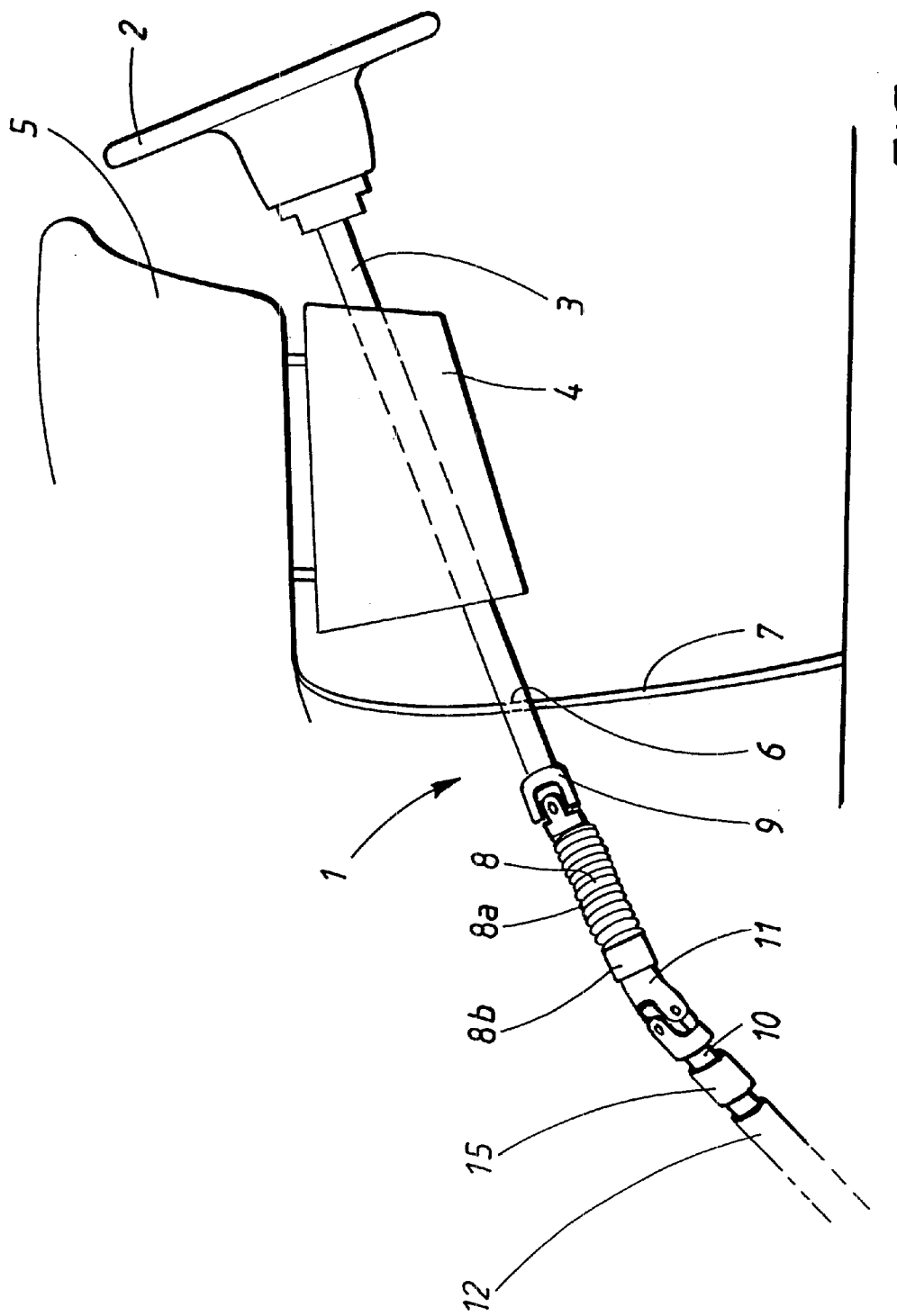
FIG. 1 shows a schematic side view of a vehicle that incorporates an exemplary steering system arranged and installed according to the present invention.

FIG. 1 shows a diagrammatic or schematic side view of a vehicle that includes a steering system 1 in which the present invention may be incorporated. The vehicle can take the form, for example, of a passenger car. According to a preferred embodiment of the invention, the steering system 1 includes a steering wheel 2 that is connected to an upper main shaft 3 in conventional manner. According to this embodiment, the upper main shaft 3 is of the type that is arranged so that it extends through a specially designed steering column 4 that is firmly mounted in the vehicle, preferably on the underside of the dashboard 5 of the vehicle.

The upper main shaft 3 is suspended in the steering column 4 in a conventional manner and is therefore not described in detail. For example, the steering column 4 may include an arrangement for adjusting the upper main shaft 3 upwards and downwards. Furthermore, the steering column 4 is preferably adapted so that it can absorb energy when acted on by a force; a situation that can occur if the driver strikes the steering wheel 2, especially during a crash of the vehicle which can cause the driver/passenger(s) to forcefully collide with internal parts of the vehicle. Adapting a steering column with such an energy-absorption capacity is known and may be based on the upper main shaft 3 being connected to a deformable component which is also fixed in the steering column 4. This component is then allowed to deform thereby absorbing energy if the steering wheel 2 and the upper main shaft 3 are acted on with great force; typically, the upper main shaft 3 moving relative to the steering column 4 during the energy absorption process.

The upper main shaft 3 extends through a guide passage 6 in an intermediate panel 7 of the vehicle. Furthermore, that end portion of the upper main shaft 3 which projects into the guide passage 6 is connected to a lower main shaft 8 via a coupling element in the form of a joint 9 of known type. Utilizing this configuration, the torque applied by the driver upon the steering wheel 2, and thus also upon the upper main shaft 3, is transmitted to the lower main shaft 8.

According to the invention, a lower end portion of the lower main shaft 8, that is, the end portion that is not connected to the above-mentioned joint 9, is connected to a specially designed spindle 10 via a second joint 11. According to the detailed description below, the spindle 10 is adapted to be interconnected with the steering gear of the vehicle, specifically via a rotary shaft in the form of a pinion 12 forming part of the steering gear. This pinion 12 projects up from the rest of the steering gear so that its end portion is positioned at a predetermined location in the vehicle, in close proximity to the point where the spindle 10 is intended to be positioned.

Figure 2:
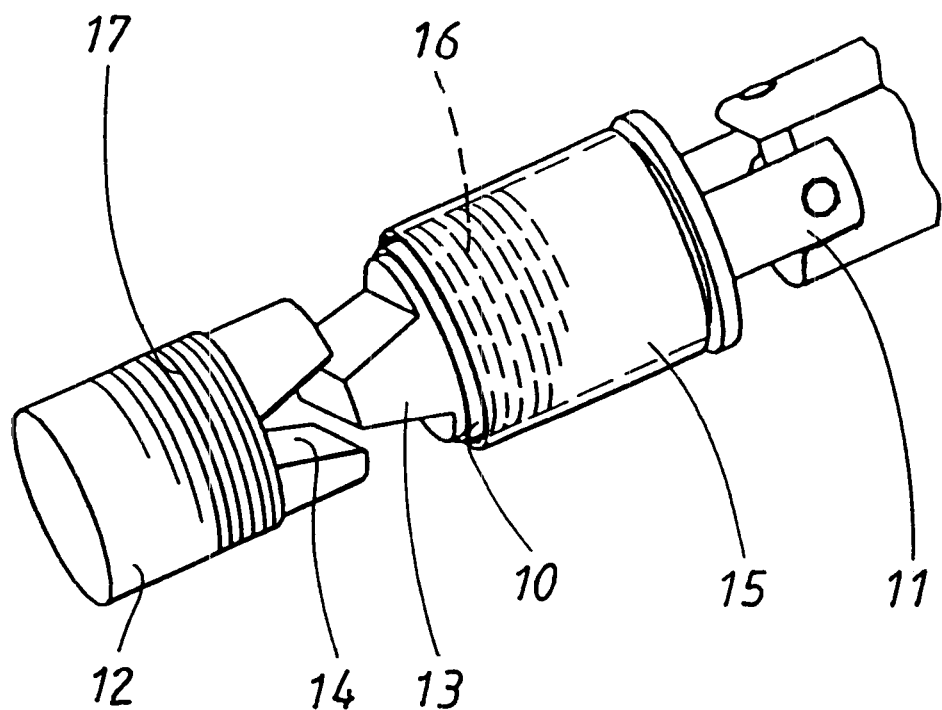
FIG. 2 shows a detailed perspective view of an exemplary embodiment of an arrangement for affecting the teachings of the present invention.

According to the detailed description below, the invention comprises a special type of connection between the spindle 10 and the pinion 12. It may be pointed out that FIG. 1 shows the arrangement according to the invention in the state in which the spindle 10 and the pinion 12 have been interconnected. With reference to FIG. 2, which is a detailed view showing the spindle 10 and the pinion 12 in the state before they have been interconnected, it can be seen that the spindle 10 is designed with a wedge-shaped projection 13. This projection 13 constitutes a deformation which is designed as a termination on the spindle 10, that is to say on that end of the spindle 10 which faces away from the second joint 11. The wedge-shaped projection 13 is designed so as to interact with a second deformation in the form of an internally wedge-shaped recess 14 which is in turn designed as a termination on the end portion of the pinion 12.

The spindle 10 carries an essentially cylindrical locking sleeve 15 which surrounds the spindle 10 and is axially displaceable a predetermined distance along the spindle 10. For this purpose, the locking sleeve 15 has an inner diameter which slightly exceeds the outer diameter of the spindle 10. The axial movement of the locking sleeve 15 is preferably limited by a stop (not shown) or the like which is arranged in the spindle 10. Furthermore, the inner surface of the locking sleeve 15 is provided with internal threads 16 which are indicated by dashed lines in FIG. 2. These internal threads 16 are intended to interact with external threads 17 formed around the surface on the end portion of the pinion 12. In this way, the spindle 10 can be locked securely to the pinion 12 so that the wedge-shaped projection 13 is in locking engagement with the wedge-shaped recess 14. In this way, the movement of the steering wheel 2 can be transmitted to the pinion 12 which, in turn, transmits this movement to a rack (not shown) that forms part of the steering gear.

With reference again to FIG. 1, it can be seen that the lower main shaft 8 is preferably designed as a bellows-shaped tube 8a. By way of this design, the lower main shaft 8 will have a low buckling force, but is at the same time torsionally rigid. Furthermore, the lower main shaft 8 is preferably terminated by a coupling element in the form of a cylindrical block 8b made of rubber or equivalent material, which then serves as a coupling to the second joint 11.

The arrangement according to the invention as heretofore described may be used in the following manner to mount a steering system into a vehicle. The upper main shaft 3 may be assembled beforehand, together with the steering wheel 2 and the lower main shaft 8, via the first joint 9. Moreover, the spindle 10 can be mounted on the lower main shaft 8 beforehand via the second joint 11. Furthermore, a steering gear is mounted in the vehicle beforehand, the pinion 12 then projecting up to a predetermined position in the engine space of the vehicle. In the event that mounting of the steering system is carried out manually, the entire unit that includes the steering wheel 2, the upper main shaft 3, the lower main shaft 8, the spindle 10 and the joints 9,11 can be mounted in position in relation to the steering column 4; that is to say, so that the upper main shaft 3 has its extent through the steering column 4. The steering column 4 is then mounted and fixed on the underside of the dashboard of the vehicle. After this stage, the lower main shaft 8 and the spindle 10 will hang down from the first joint 9. In this situation, the fitting technician can grasp the spindle 10 and guide it towards the end portion of the pinion 12.

By virtue of the arrangement according to the invention; that is, one in which the spindle 10 and the pinion 12 includes the above-mentioned deformations 13,14, the fitting technician can very easily, even by simply stretching the hands forward without actually seeing the area under the dashboard 5, guide the projection 13 into engagement in the recess 14 in the pinion 12. The technician can then screw the locking sleeve 15 tight so that the threads 16 of the locking sleeve 15 are locked securely against the external threads 17 on the pinion 12. In this way, very simple mounting of the steering system is achieved,; one in which a safe, secure connection between the spindle 10 and the pinion 12 is obtained.

The invention is especially suitable for use in connection with an automated production process for a vehicle. In this case, the steering system 1 of the vehicle can be mounted by a robot that is programmed to first locate the spindle 10 in the state in which it hangs down, together with the lower main shaft 8 from the first joint 9. The robot can then be programmed to carry out a movement in order to take hold of the spindle 10. The next stage of mounting has the robot arm guide the spindle 10 into position on the end portion of the pinion 12. For this purpose, the robot is programmed beforehand with information relating to the position in which the end portion of the pinion 12 is expected to be positioned. The wedge-shaped projection 13 is then guided into engagement in the wedge-shaped recess 14. The automated mounting method is completed by the locking sleeve 15 being screwed tight. This can also be performed by a tool belonging to the robot, which brings the locking sleeve 15 into engagement with the threads 17 of the pinion 12 and then screws the locking sleeve 15 tight.

By using a type of connection having a deformation in the form of a wedge that interacts with a corresponding shaped recess, a highly reliable connection of guaranteed quality is obtained. A further advantage of the invention is that the wedge-shaped projection 13 can be shaped by casting, while the wedge-shaped recess 14 can be shaped by milling; the overall result of which is low cost in production terms.

It may be pointed out that FIG. 1 shows the arrangement according to the invention as it appears after the steering system 1 has been mounted in position and the locking sleeve 15 has been screwed tight.

The invention is not limited to the embodiment described above, but can be varied within the scope of the patent claims below. For example, the invention can be used in different types of vehicles, for example passenger cars and lorries.

Moreover, the above-mentioned deformations can be designed as a wedge which interacts with a corresponding shaped recess (as shown in FIG. 2) or alternatively as deformations with another geometrical shape, for example as a pin of square cross section which projects into a square recess.

Furthermore, the wedge-shaped projection can be formed on the pinion, and the wedge-shaped recess can be formed on the spindle, that is to say the opposite of the arrangement shown in FIG. 2.

A steering assembly the facilitates assembly and installation, and which assures a secure interconnection for steering the vehicle has been described herein. The method by which the advantageous installation is performed has also been disclosed. These and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

What is claimed and desired to be secured by Letters Patent is as follows:

1. An arrangement for a steering system for a vehicle, comprising:

a steering wheel and a main shaft connected to said steering wheel and suspended in the vehicle, said main shaft being connected to a steering gear of the steering system;

an input shaft for transmitting rotary movement of said main shaft to said steering gear, and wherein an end portion of said main shaft facing said input shaft terminates in a first deformation adapted for locking interaction with a second deformation in said input shaft, said locking interaction adapted so that said rotary movement is transmitted to the steering gear; and said main shaft terminating in a spindle that bears an axially displaceable locking sleeve having internal threads adapted to interact with external threads formed on the surface of said input shaft.

2. The arrangement as recited in claim 1, wherein said first deformation comprises a substantially wedge-shaped projection formed on said spindle.

3. The arrangement as recited in claim 2, wherein said second deformation comprises a substantially wedge-shaped recess formed on an end portion of said input shaft.

4. Arrangement for a steering system for a vehicle, comprising a steering wheel and a main shaft which is connected to the steering wheel and also suspended in the vehicle, the main shaft being connected to a steering gear which belongs to the steering system and comprising an input shaft for transmission of a rotary movement of the main shaft to said steering gear, and wherein the end portion of said main shaft facing the input shaft is terminated by a first deformation adapted for locking interaction with a second deformation in the input shaft, by means of which said rotary movement is transmitted to the steering characterized in that said main shaft is terminated by a spindle which bears an axially displaceable locking sleeve which is designed with internal threads adapted to interact with external threads formed on the surface of said input shaft.

5. The arrangement as recited in claim 4, wherein said first deformation consists of an essentially wedge-shaped projection formed on said spindle.

6. The arrangement as recited in claim 5, wherein said second deformation comprises an essentially wedge-shaped recess formed on the end portion of said input shaft.

7. An arrangement a steering system for a vehicle, comprising:

a main shaft connected to a steering wheel and suspendable in a vehicle, said main shaft being adapted to be connected to a steering gear of the steering system;

a pinion shaft adapted for transmitting rotary movement of said main shaft to the steering gear;

an end portion of said main shaft facing said pinion shaft terminates in a first deformation adapted for locking interaction with a second deformation in said pinion shaft; and said main shaft terminating in a spindle upon which an axially displaceable locking sleeve is located, said axially displaceable locking sleeve having internal threads adapted to interact with external threads formed on an exterior surface of said pinion shaft.

8. The arrangement as recited in claim 7, wherein said first deformation comprises a substantially wedge-shaped projection formed on said spindle.

9. The arrangement as recited in claim 7, wherein said second deformation comprises a substantially wedge-shaped recess formed on an end portion of said input shaft, said substantially wedge-shaped recess adapted for interlocking engagement with said substantially wedge-shaped projection formed on said spindle.

10. A method for mounting a steering system in a vehicle, said method comprising:

providing a steering system having a steering wheel and a main shaft connected to said steering wheel and suspended in said vehicle, said main shaft being connected to a steering gear of the steering system, and an input shaft for transmitting rotary movement of said steering wheel and said main shaft to said steering gear;

mounting said main shaft together with said steering wheel in said vehicle;

taking hold of an end portion of said main shaft facing the input shaft;

guiding said end portion of said main shaft into engagement with said input shaft, said end portion of said main shaft terminating in a first deformation adapted for locking interaction with a second deformation in said input shaft;

locking said end portion of said main shaft securely against the input shaft so that rotary movement is transmitted to the steering gear; and tightening an axially displaceable locking sleeve arranged on said end portion of said main shaft, said tightening enabled by internal threads on said locking sleeve being adapted to interact with external threads formed on a surface of said input shaft.

11. An method for mounting a steering system in a vehicle, said steering system having a steering wheel and a main shaft connected to the steering wheel, the main shaft being suspended in the vehicle, wherein the main shaft is connected to a steering gear belonging to the steering system, the steering gear having an input shaft for transmission of a rotary movement of the steering wheel and the main shaft to said steering gear, said method comprising:

mounting said main shaft together with said steering wheel in the vehicle;

taking hold of that end portion of said main shaft facing the input shaft;

guiding said end portion into engagement with the input shaft, said end portion being terminated by a first deformation adapted for locking interaction with a second deformation in the input shaft;

locking said end portion securely against the input shaft so that said rotary movement can be transmitted to the steering gear; and tightening an axially displaceable locking sleeve arranged on said end portion and designed with internal threads adapted to interact with external threads formed on the surface of said input shaft.

* * * * *